Feb. 9, 1937. R. R. JACKSON 2,069,955
HEAT GATHERER AND DEFLECTOR FOR MOTOR VEHICLES
Filed June 14, 1933
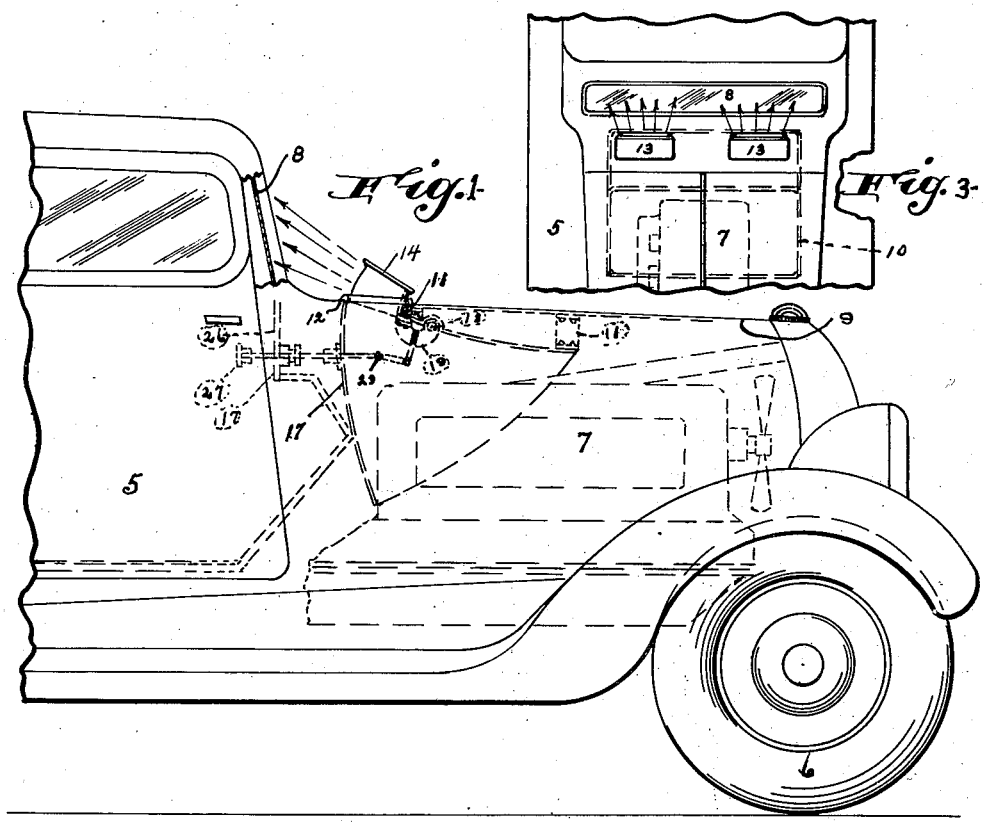
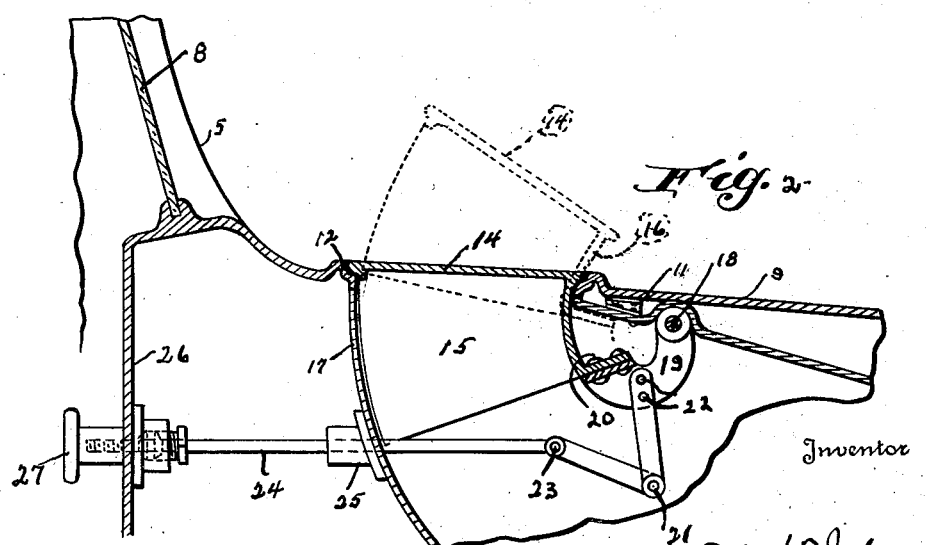

Patented Feb. 9, 1937

2,069,955

UNITED STATES PATENT OFFICE 2,069,955

HEAT GATHERER AND DEFLECTOR FOR MOTOR VEHICLES

Richard R. Jackson, Baltimore, Md., assignor of one-half to Alexander M. Knapp, Baltimore, Md.

Application June 14, 1933, Serial No. 675,725

1 Claim. (Cl. 20—40.5)

This invention relates to certain improvements in a heat gatherer and deflector particularly adapted for motor vehicles, whereby the heat of the engine of said vehicle may be gathered and conveyed to and over the surface of the wind-shield to prevent the accumulation on the exterior surface thereof of ice, frost, snow, or the like, while driving and thus assuring the driver a clear and unobstructed vision at all times.

It is the purpose of the invention to provide a heat gatherer and deflector having such features that upon being attached to any type of motor vehicle's engine and component parts thereof, the same will produce in combination with the engine, hood, and wind-shield of the motor vehicle sufficient hot air arising from the engine, properly convey the same to the surface of the wind-shield so as to prevent any accumulation thereon of ice, snow, or the like, while driving, thus assuring a driving visibility at all times.

A further purpose of the invention is that the heat gatherer and deflector, when properly installed on a motor vehicle, will convey the majority of the heat from said engine out through the top portion of the hood and be deflected directly against the exterior surface of the wind-shield and thence conveyed up and over the top of the vehicle thereby assuring a cooler interior of the vehicle due to the fact that the heat is being conveyed away from the dash and lower parts thereof. It can be readily seen that the heat gatherer and deflector forms a dual function of providing a cooling medium for the vehicle in warm climates while driving and a heater for the wind-shield to keep the same clean and clear when driving in cold, moist climates.

Another object of the present invention is the provision of a heat gathering deflector having a control therefor, located in the interior of the vehicle in easy and accessible range of the driver, whereby said gathered heat may be deflected at the driver's will over the exterior surface of the wind-shield and thence up and over the vehicle top.

It is a well known fact that in driving automobiles, or the like, it is necessary that the visibility through the wind-shield thereof be clear and unobstructed at all times, and this is rendered impossible when driving in cold climates where there is freezing of moisture, or the like, on the exterior surface of the wind-shield, and it is to overcome this serious objection that the present invention has been adopted, for with the heat gatherer in the form of a casing surrounding the engine under the hood, openings at the top of the hood adjacent the wind-shield, inclined covers for said openings, so that the latter may be opened or closed, and when in open position provide means that the gathered heat in the casing may be conveyed directly to the surface of the wind-shield to keep the same clear and the vision of the driver behind the latter unobscured.

With these and other objects in view, the invention consists in certain novel features, combination and arrangement of parts as will be hereinafter more fully described, pointed out in the accompanying drawing, and claimed.

In the drawing,

Figure 1 is a side elevational view of a motor vehicle, partly in section, with my invention applied thereto, said invention in the most part being shown in dotted lines;

Figure 2 is a transverse, sectional view of the motor vehicle partly broken away, and equipped with my improved invention in detail; and, Figure 3 is a fragmentary, top plan view.

Referring to the drawing, the numeral 5 indicates a fragmentary portion of a vehicle and constitutes in its entirety the usual vehicle structure having a chassis mounted on wheels 6, engine 7, wind-shield 8, and hood 9, and it is primarily a combination of the engine, wind-shield and hood of the vehicle 5, to which my invention is applied.

The invention consists of a single piece casing 10, which surrounds the rear and top portion of the engine 7, and is suspended within the hood and about said engine by virtue of a bracket 11 and being attached to the hood portion. The upper surface of the hood, adjacent the wind-shield, is provided with outward openings 13, and these openings are normally closed by closures 14, which may be designated as deflector closures 14. The closures 14 normally fit snug within the openings 13, as clearly illustrated in Figures 1 and 2 of the drawing, and each is provided with side walls 15 and a rear wall 16, that portion of the closure deflector adjacent the wind-shield 8 being fully opened, the purpose of which will be hereinafter more fully described.

The casing 10 has its rear end closed by a wall 17. This permits the heat gathered therein to be forced upward and through the openings 13 of the hood 9 by virtue of the fact that the top peripheral edge of this casing 10 forms a part of the hood 9, as at 12. Journaled transversely across the hood 9 and on the interior thereof, is a bar 18, on which is mounted an eccentric member 19, and secured to the free end of this eccentric member 19 is the inner closed end of the closures 14, as at 20.

A bell crank lever 21 has one end secured, as at 22, to the eccentric 19 intermediate points 18 and 20. The free end of this bell crank lever 21 is pivotally secured, as at 23, to a horizontal operating rod 24, this rod being journaled through a bushing 25 carried by the rear wall 17 of the casing 10. Its free end extends through and beyond the dash 26 of the motor vehicle 5 to the interior thereof, on which is secured an operating knob 27, this knob being in easy, accessible range of the driver so that the opening and closing of the closures 14 may be assured.

It can be readily understood that applicant has shown one form of heat gatherer and deflector, which has a dual function of permitting the hot air from the engine 7 to be used as a wind-shield cleaner under adverse weather conditions, or it will convey the heated air from the engine up and over the vehicle roof in warmer climates wherein the use of the heated air for cleaning purposes is not needed. By virtue of the fact that this heat is conveyed by the single piece casing 10 and due to the position of its rear wall 17, the interior of the motor, particularly that portion about the feet of the driver, will be kept reasonably cool due to the fact that the heated air travels upwardly and outwardly in the direction of the arrows in Figure 1 of the drawing and it is deflected up and out over the roof of the vehicle.

It is to be understood that the preferred embodiment of the invention, as shown and described, with certain minor features and changes may be resorted to without departing from the spirit and scope of the invention as claimed.

What I claim as new is:

A heat gatherer and deflector comprising a single piece casing having a rear wall, top wall and side walls, a bracket secured to the top wall at the open end thereof and to the interior of a hood so as to position said casing completely around and about and in close proximity to the rear, top and side portions of an internal combustion engine, the upper wall of the casing provided with openings adapted to register with openings formed in the hood to provide a continuous passage, closures for said hood openings, and means extending through the rear wall of the casing into and beyond the dash of a motor vehicle whereby said closures may be opened or closed for the purpose of permitting the heat gathered in the casing to be deflected therefrom when said closures are in open position.

RICHARD R. JACKSON.